United States Patent
Brehm et al.

(10) Patent No.: US 6,637,720 B2
(45) Date of Patent: Oct. 28, 2003

(54) COMPONENT FOR HOLDING DOWN MEASURING LEADS

(75) Inventors: Armin Brehm, Nussbaumen (CH); Goran Radovik, Untersiggenthal (CH); Hugo Wetter, Buchs (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 10/187,619

(22) Filed: Jul. 3, 2002

(65) Prior Publication Data

US 2003/0026665 A1 Feb. 6, 2003

(30) Foreign Application Priority Data

Jul. 13, 2001 (CH) ..................... 2001 1305/01

(51) Int. Cl.[7] ............................... F16M 11/00
(52) U.S. Cl. ..................... 248/694; 29/525; 407/64
(58) Field of Search .................... 248/694; 407/64; 403/24; 29/525

(56) References Cited

U.S. PATENT DOCUMENTS

| 3,943,758 A | * | 3/1976 | Wolf et al. .................... 73/67 |
| 3,968,758 A | * | 7/1976 | Scholz ..................... 112/80.04 |
| 6,164,863 A | | 12/2000 | Hedley |

FOREIGN PATENT DOCUMENTS

| DE | 19705413 A1 | 7/1997 |
| EP | 0691478 A2 | 1/1996 |
| FR | 2559558 | 8/1985 |

* cited by examiner

Primary Examiner—Ramon O. Ramirez
(74) Attorney, Agent, or Firm—Burns, Doane, Swecker & Mathis, L.L.P.

(57) ABSTRACT

The invention relates to a component for holding down measuring leads and measuring devices in a groove (6), provided therefor and having holes (7), of a machine part (5). It is characterized in that the component is designed in the form of a disk (1) which has a cutting edge (3) on its circumference, the cutting edge (3) not being formed continuously over the entire circumference but consisting of two partial cutting edges (3', 3") circumferentially opposite one another. In addition, the disk (1) has a central opening (2) in the form of a hexagon socket. For fitting, the disk (1) is put into the hole (7) in such a way that its two partial cutting edges (3', 3") point in the longitudinal direction of the groove (6), then a hexagon socket key is inserted into the opening (2) of the disk (1) and the key is turned while the disk (1) is pressed down at the same time, so that the cutting edges (3', 3") cut into the material of the machine part (5) and jam tight.

6 Claims, 2 Drawing Sheets

COMPONENT FOR HOLDING DOWN MEASURING LEADS

TECHNICAL FIELD

The invention relates to a component for holding down measuring leads and measuring devices in a groove, provided therefor, of a machine part.

PRIOR ART

It is known to monitor machines, such as thermal turbomachines for example, during operation by means of special measuring devices in order to be able to quickly detect faults in the machine. On the one hand, it is thus possible, on account of manual or automatic corrections immediately carried out, to prevent damage to the machine in the operating state or, in the worst case, stoppage of the machine; on the other hand, such measurements provide for potential improvements to the machine by weak points being detected.

The measuring leads are laid in grooves which are normally milled in the relevant machine parts. In order to ensure that the measuring leads remain in the grooves provided for them when they are fitted, special components—"hold-downs"—have to be used.

For example, it is known to use a heavy-duty spring dowel sleeve as a hold-down for measuring leads which are used in gas turbines. In this case, the heavy-duty spring dowel sleeve is pressed into a transverse groove which is arranged perpendicularly to the groove for the measuring leads. Disadvantages with this solution are, on the one hand, the high costs which are caused by the requisite very exact flanks when milling the transverse groove and, on the other hand, inevitable breakdowns on account of the point-like contact, which can scarcely be avoided, of the heavy-duty spring dowel sleeve on the measuring lines or measuring devices.

It has been attempted to avoid these disadvantages by means of another known technical solution in which spaced-apart holes are made along the groove, arranged in the machine part, for accommodating the measuring leads. These holes have a diameter which is larger than the groove width. The depth of the holes is less than the depth of the groove. In order to hold down the measuring leads in the groove, snap rings which are open on one side are inserted into the holes. However, these snap rings require an undercut groove for fitting and clamping, so that the cost of production is also relatively high with this solution. A further disadvantage consists in the fact that the snap ring only has a small clamping force, which even decreases during operation of the gas turbine, so that the snap ring jumps away in a spring-loaded manner and can thus no longer perform its task as a hold-down.

DESCRIPTION OF THE INVENTION

The invention attempts to avoid these disadvantages of the known prior art. The object of the invention is to develop a component for holding down measuring leads and measuring devices in a groove, provided therefor, of a machine, which component, on the one hand, can be produced in a simple and thus cost-effective manner and, on the other hand, can be fitted easily and without special tools, and also reliably holds the measuring leads in the groove during widely varying operating conditions of the machine.

This object is achieved according to the invention in that the component is designed in the form of a disk which has a cutting edge on its circumference, the cutting edge not being formed continuously but consisting of two partial cutting edges circumferentially opposite one another. An opening in the form of a hexagon socket is arranged centrally in the disk.

The method of fitting the disk according to the invention is characterized in that first the disk is put into the hole of the groove in such a way that the two partial cutting edges point in the longitudinal direction of the groove, in that a hexagon socket key is then inserted into the opening of the disk, and in that finally the key is turned while the disk is pressed down at the same time, so that the cutting edges cut into the material of the machine part and jam tight.

The advantages of the invention consist firstly in the fact that the component according to the invention can be produced in a cost-effective manner, for it is a component of very simple design. Secondly, it is advantageous that no special tools are required for fitting the component into the groove. The hole to be made in the groove of the machine component for accommodating the component according to the invention is a perfectly normal hole without a specially required tolerance or without an undercut groove. This technical solution also provides for simple standardization. New disks fit without any problems into old holes and old disks into new holes.

It is expedient if the cutting edge is arranged at half the height of the disk and has a flank angle $\alpha/2$ of 30°. In this case, no canting occurs during the fitting.

Furthermore, it is advantageous if the disk for holding down the measuring leads in the groove of the machine part is made of an austenitic steel and the machine part with the groove is in contrast made of a ferritic material. Since the austenitic material has a higher coefficient of thermal expansion than the ferritic material, the austenitic disk, during operation, expands more than the ferritic machine part with the groove on account of the generation of heat. Consequently, the disk jams, so that it sits very tightly in the groove and ensures robust holding-down of the measuring leads.

BRIEF DESCRIPTION OF THE DRAWING

Two exemplary embodiments of the invention are shown in the drawing, in which.

Only the features essential for the invention are shown. The same elements have the same reference numerals in different figures.

WAYS OF IMPLEMENTING THE INVENTION

The invention is explained in more detail below with reference to exemplary embodiments and FIGS. 1 to 6.

FIGS. 1 to 4 first of all show the component according to the invention in a first embodiment variant in various representations and can advantageously be used at the same time for the description of the invention.

Figure 3:
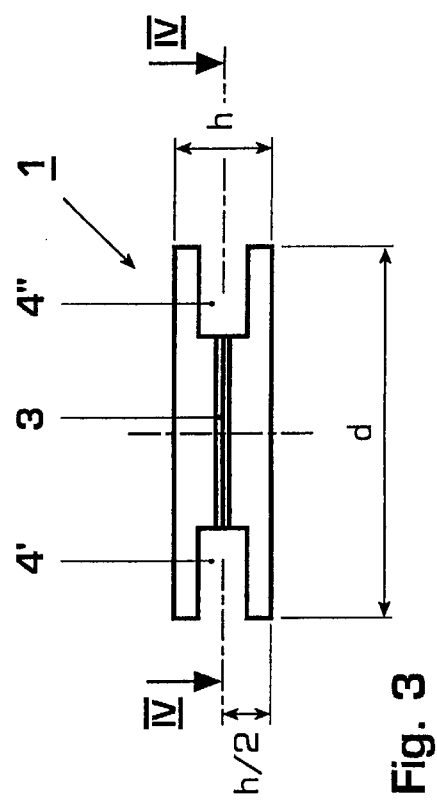
FIG. 3 shows a side view of the component according to FIG. 1.
Figure 4:
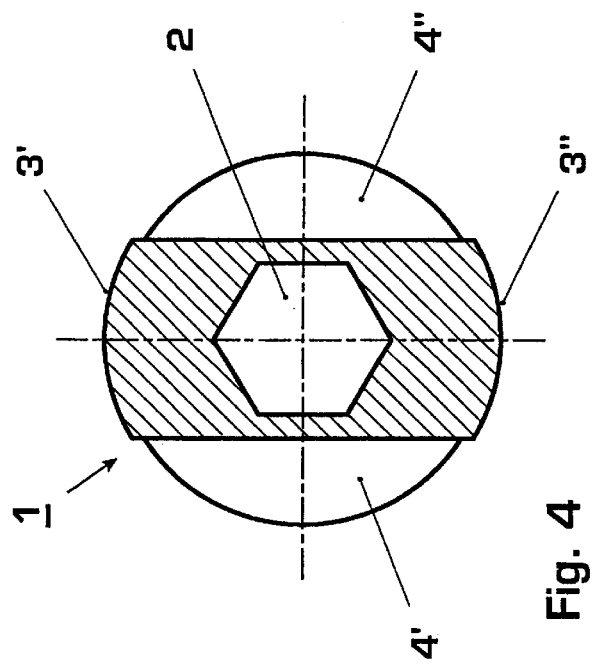
FIG. 4 shows a section through the component along line IV—IV in FIG. 3.
Figure 2:
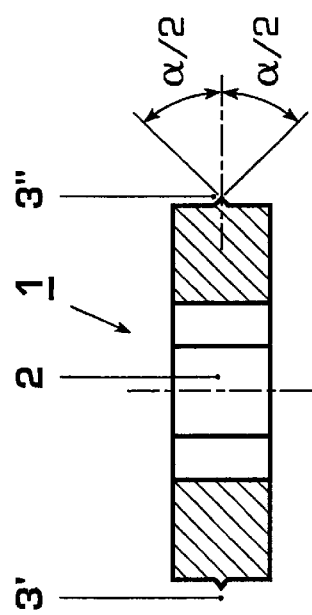
FIG. 2 shows a section through the component along line II—II in FIG. 1.
Figure 1:
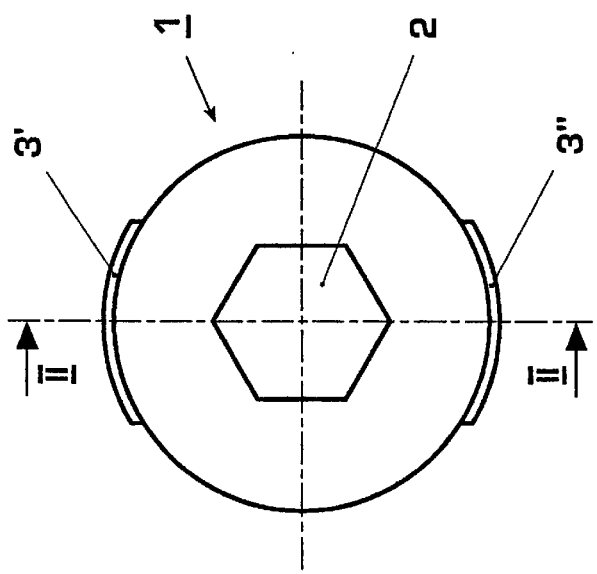
FIG. 1 shows a plan view of the component according to the invention in a first embodiment.

FIG. 1 is a plan view of the component, a section along line II—II in FIG. 1 is shown in FIG. 2, FIG. 3 shows a side view in the direction of the cutting edge, and a section along line IV—IV in FIG. 3 is shown in FIG. 4.

The component according to the invention is designed in the form of a disk 1 having a circular base area with a diameter d. The disk 1 has an opening 2 in the center in the form of a hexagon socket. A further special feature of the disk 1 consists in the fact that the disk 1 has a cutting edge 3 on its circumference, this cutting edge 3 not being formed continuously over the entire circumference but consisting of two partial cutting edges 3', 3" which are circumferentially opposite one another and are arranged symmetrically to one another. In addition, the cutting edge 3 is arranged at half the height h of the disk 1. It has a flank angle $\alpha/2$ of 30°. The result of this is that advantageously no canting occurs when the disk 1 is being fitted. In the embodiment shown in FIGS. 1 to 4, the disk 1, according to FIG. 3 or 4, in each case has a lateral recess 4', 4" at the locations where no partial cutting edges 3', 3" are arranged at the circumference, the recesses 4' and 4" being geometrically congruent.

Figure 5:
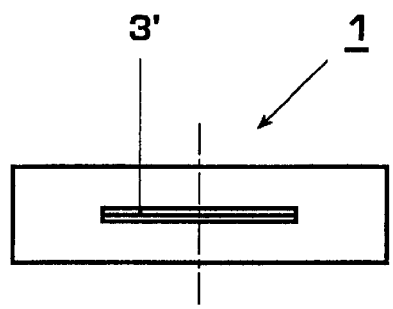
FIG. 5 shows a side view of the component according to the invention in a second embodiment.

The embodiment according to FIG. 5 is simpler. Depicted there is a side view of the disk 1 with the partial cutting edge 3'. The only difference from the first exemplary embodiment (cf. FIG. 3) consists in the fact that, at the locations where no partial cutting edges 3', 3" are arranged on the circumference, there are also no recesses 4', 4". As a result, the component as considered on the whole is more robust and the hexagon socket 2 is also no longer limited by the recesses (4', 4") (not present here).

Figure 6:
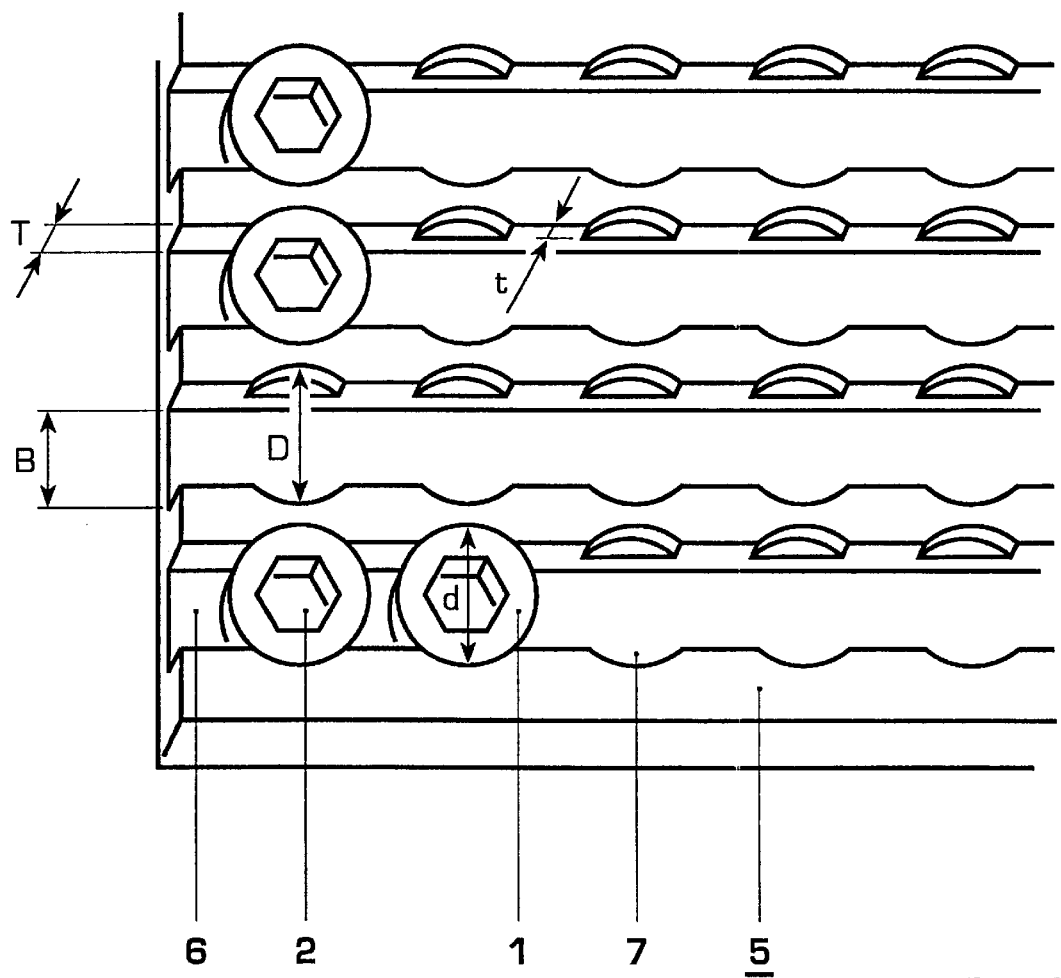
FIG. 6 shows a perspective representation of the component according to the invention fitted into the machine part.

FIG. 6, in a perspective view, shows the component according to the invention or a plurality of such components in the fitted state.

Item 5 designates the entire machine part. Grooves 6 with a groove width B and a groove depth T are milled in the machine part 5, these grooves 6 serving to accommodate measuring leads (not shown here). Spaced-apart holes 7 which have a larger diameter D than the groove width B and a smaller depth t than the groove depth T are made in each groove 6. The diameter D of the hole 7 is only slightly larger than the diameter d of the disk 1 for holding down the measuring leads.

To fit the disk 1 according to the invention, it is first of all put into the hole 7 in such a way that the two partial cutting edges 3', 3" point in the longitudinal direction of the groove 6. After that a hexagon socket key is inserted into the opening 2 of the disk 1. The hexagon socket key is then turned while the disk 1 is pressed down at the same time, so that the cutting edges 3',3" cut into the material of the machine part 5 and jam tight.

It is advantageous if the disk 1 for holding down the measuring leads in the groove 6 of the machine part 5 is made of an austenitic steel, for example a 18.8 CrNi steel, and the machine part 5 into which the disk 1 is turned is in contrast made of a ferritic material, for example a ferritic cast steel. Since the austenitic material has a higher coefficient of thermal expansion than the ferritic material, the austenitic disk 1, during operation, expands more than the ferritic machine part 5 on account of the generation of heat. Consequently, the disk 1 jams, so that it sits very tightly in the groove 6 and ensures robust holding-down of the measuring leads.

The component 1 according to the invention for holding down measuring leads in grooves 6, provided therefor, of machine parts 5 can be produced in a cost-effective manner, for it is a component of very simple design. In addition, it is advantageous that no special tools are required for fitting the disk 1 into the groove 6. The hole 7 to be made in the groove 6 of the machine part 5 for accommodating the disk 1 is a perfectly normal hole without a specially required tolerance or without an undercut groove. This technical solution also provides for simple standardization. New disks fit without any problems into old holes and old disks into new holes.

LIST OF DESIGNATIONS

1 Disk
2 Centrally arranged opening (hexagon socket)
3 Cutting edge
3', 3" Partial cutting edge
4', 4" Recess
5 Machine part
6 Groove in item 5
7 Hole for accommodating item 1
h Height of item 1
d Diameter of item 1
$\alpha/2$ Flank angle
B Width of item 6
T Depth of item 6
D Diameter of item 7

What is claimed is:

1. A component for holding down measuring leads and measuring devices in a groove, provided therefor, of a machine part, wherein the component is designed in the form of a disk which has a cutting edge on its circumference, the cutting edge not being formed continuously over the entire circumference but consisting of two partial cutting edges circumferentially opposite one another wherein the disk is placed inside said groove and the cutting edge cuts into the machine part.

2. The component as claimed in claim 1, wherein the disk has a central opening in the form of a hexagon socket.

3. The component as claimed in claim 1, wherein the disk has a lateral recess at the locations where no cutting edge is arranged at the circumference.

4. The component as claimed in claim 1, wherein the cutting edge is arranged at half the height of the disk and has a flank angle of 30°.

5. The component as claimed in claim 1, wherein the disk is made of an austenitic steel, whereas the machine part with the groove for the measuring leads to be held down is made of a ferritic material.

6. A method of fitting a component for holding down measuring leads and measuring devices in a groove, provided therefor, of a machine part as claimed in claim 1, there being a hole in the groove for the purpose of accommodating the component in the form of a disk, this hole having a larger diameter than the groove width and a smaller depth than the groove depth, and the diameter of the hole being only slightly larger than the diameter of the disk, the method comprising the steps of
 a) putting the disk into the hole in such a way that its two partial cutting edges point in the longitudinal direction of the groove,
 b) inserting a hexagon socket key into the opening of the disk, and
 c) turning the key while the disk is pressed down at the same time, so that the cutting edges cut into the material of the machine part and jam tight.

* * * * *